US012690712B2

(12) United States Patent
Hsieh

(10) Patent No.: US 12,690,712 B2
(45) Date of Patent: Jul. 28, 2026

(54) PRESS DEVICE

(71) Applicant: Jeff Hsieh, New Taipei (TW)

(72) Inventor: Jeff Hsieh, New Taipei (TW)

( * ) Notice: Subject to any disclaimer, the term of this patent is extended or adjusted under 35 U.S.C. 154(b) by 1131 days.

(21) Appl. No.: 17/583,907

(22) Filed: Jan. 25, 2022

(65) Prior Publication Data

US 2022/0330739 A1    Oct. 20, 2022

(30) Foreign Application Priority Data

Apr. 20, 2021    (TW) ................................. 110114051

(51) Int. Cl.
*A47J 31/06*        (2006.01)
*B30B 11/04*        (2006.01)
(52) U.S. Cl.
CPC ........... *A47J 31/0663* (2013.01); *B30B 11/04* (2013.01)
(58) Field of Classification Search
CPC ........ B30B 11/04; A47J 31/44; A47J 31/0663
See application file for complete search history.

(56) References Cited

U.S. PATENT DOCUMENTS 6,539,864 B1 * 4/2003 Berggren ................. B41K 1/58
101/368

FOREIGN PATENT DOCUMENTS

| CN | 106073506 A | | 11/2016 |
| CN | 211985120 U | * | 11/2020 |
| DE | 202016008590 U1 | | 8/2018 |

OTHER PUBLICATIONS

European Extended Search Report mailed Jul. 19, 2022, in counterpart European application EP22153699.8, 10 pages in English.
Taiwan Office Action and Search Report mailed Jun. 21, 2021, in counterpart Taiwan application 110114051, 7 pages in Chinese.

* cited by examiner

*Primary Examiner* — Elizabeth M Kerr
*Assistant Examiner* — Kuangyue Chen
(74) *Attorney, Agent, or Firm* — HDLS IPR SERVICES; Chun-Ming Shih

(57)                ABSTRACT

A press device for pressing powders in a container is provided. The press device has a compact structure that can be operated by one hand of a user and comprises an operation element, a pressing element, a body and at least one elastic element, wherein the at least one elastic element is provided between the operation element and the pressing element. A surface of the pressing element is urged by the force provided by the at least one elastic element to press the powders in the container.

16 Claims, 10 Drawing Sheets

PRESS DEVICE

TECHNICAL FIELD

The present disclosure relates to a press device, and in particular, to a press device for pressing powders.

BACKGROUND

Coffee has become one of the most widely consumed beverages in human society. Various types of coffee are available in the market for consumers to choose, ranging from inexpensive canned premade coffee to drip coffee made at home to single-origin coffee in deluxe coffee shops, providing a cornucopia of choice in terms of quality and convenience. Consumers tastes have become increasingly discerning, with scrutiny given to every step in the process of making the best brew, from selection of coffee variety, processing methods, and level of roasting.

Coffee is classified according to extraction method, and may be mainly classified into drip filter coffee, espresso coffee, and siphon coffee. Taking espresso as an example, the process is mainly as follows. First, coffee powders are loaded into a handled powder plate. Next, the coffee powders are pressed and placed into an espresso machine to extract coffee. Under the pressure of the coffee machine, a high-pressure state is achieved during extraction, and a large amount of mellow and rich espresso with a layer of crema on the surface is released. The released liquid may be used for preparation of more extravagant beverages such as latte and cappuccino. A powder-press device is a commonly used tool in espresso, which is mainly configured to press coffee powders in a handle to form a flat horizontal plane, which allows hot water to pass through the coffee powders stably for extraction, and also enables the coffee powders to withstand the huge pressure generated by the machine during extraction without being broken up and affecting the extraction quality. The pressing force during powder pressing needs to be determined depending on the fineness of the grind of the coffee powders.

Conventional powder press devices generally require the user to manually align the handle and adjust the pressure. However, such powder press devices cannot ensure consistency or stability of powder pressing operations and may not compact the coffee powders to the degree required.

Based on the above, there is need in the industry for a powder-press device that resolves the existing problems that pressure and pressing angle and height need to be adjusted manually.

SUMMARY OF INVENTION

Therefore, to achieve the foregoing objectives, an embodiment of the present disclosure relates to a press device, including an operation element, a pressing element, a first elastic element, and a body. The pressing element is detachably connected to one side of the operation element, and has a pressing surface for pressing powders in a container. The first elastic element is disposed between the operation element and the pressing element, and opposing ends of the first elastic element abut against the operation element and the pressing element, respectively. One side of the body is configured to abut against an end surface of the container, and the other side of the body is configured to be engaged with the operation element.

BRIEF DESCRIPTION OF THE DRAWINGS

The present disclosure as well as a preferred mode of use, further objectives, and advantages thereof will be best understood by referring to the following detailed description of illustrative embodiments in conjunction with the accompanying drawings, wherein.

DETAILED DESCRIPTION

Figure 1:
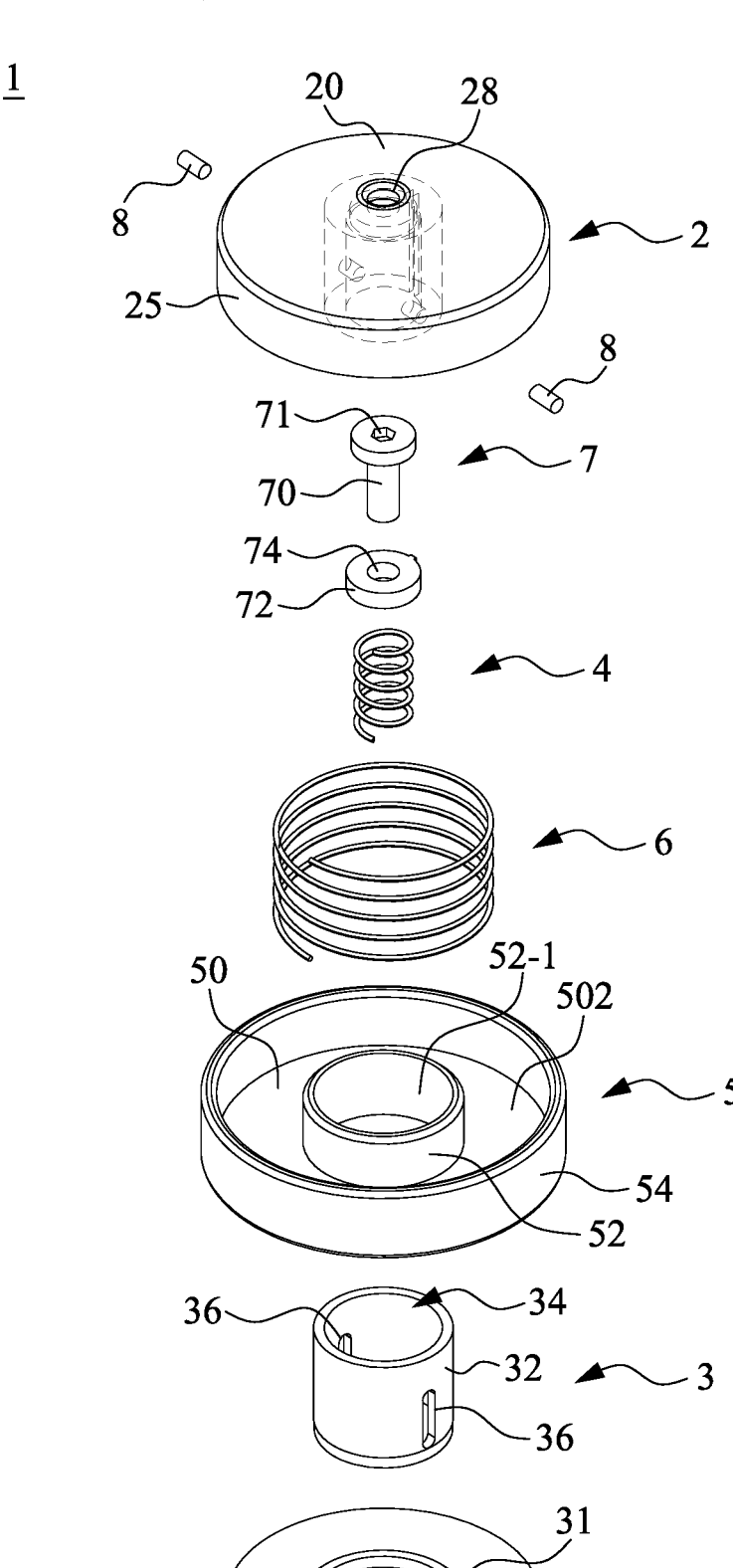
FIG. 1 is a three-dimensional schematic exploded view 1 of a press device according to a first embodiment of the present disclosure.

The characteristics, subject matter, advantages, and effects of the present disclosure are detailed hereinafter by reference to embodiments of the present disclosure and the accompanying drawings. It is understood that the drawings referred to in the following description are intended only for purposes of illustration, and do not necessarily show the actual proportion and precise arrangement of the embodiments. Therefore, the proportion and arrangement shown in the drawings should not be construed as limiting or restricting the scope of the present disclosure.

Figure 2:
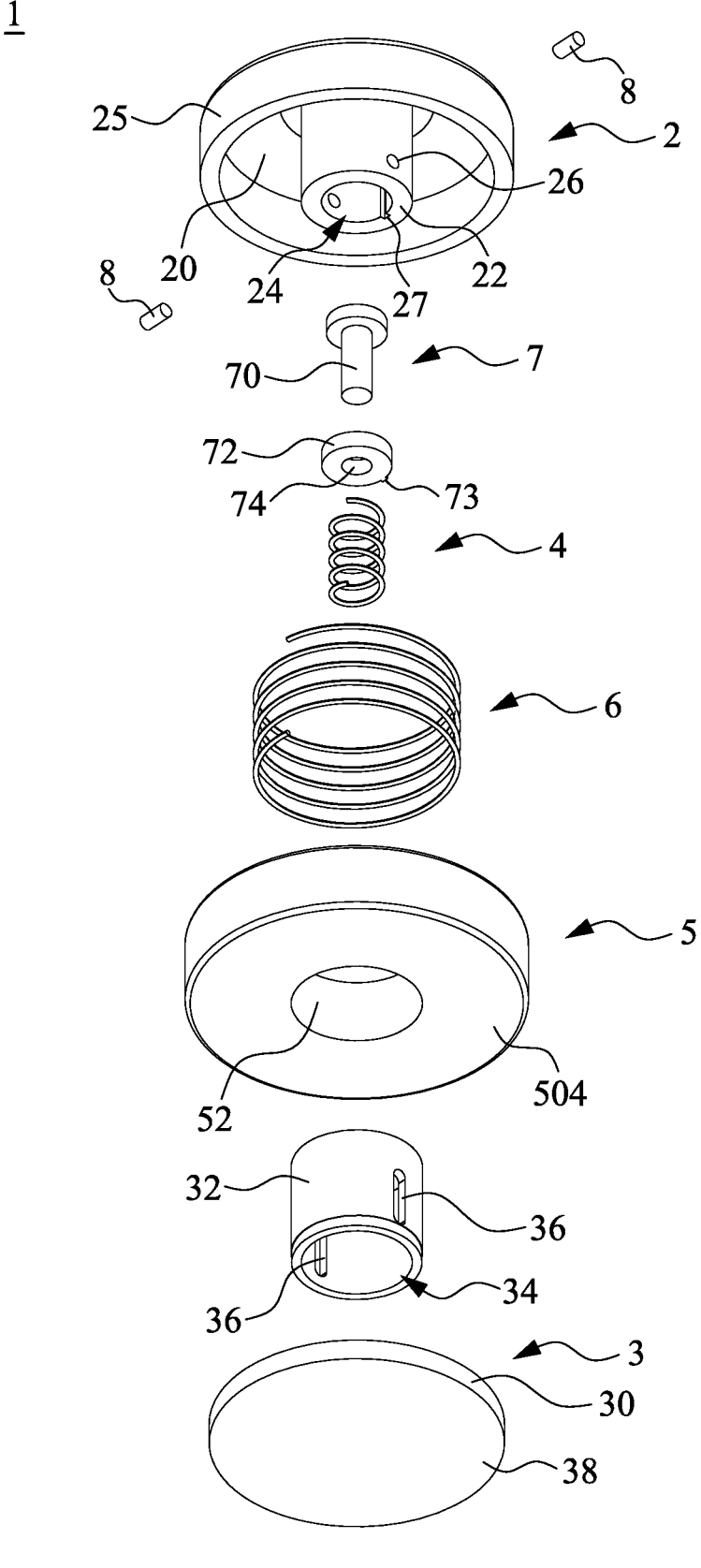
FIG. 2 is a three-dimensional schematic exploded view 2 of a press device according to a first embodiment of the present disclosure.
Figure 3:
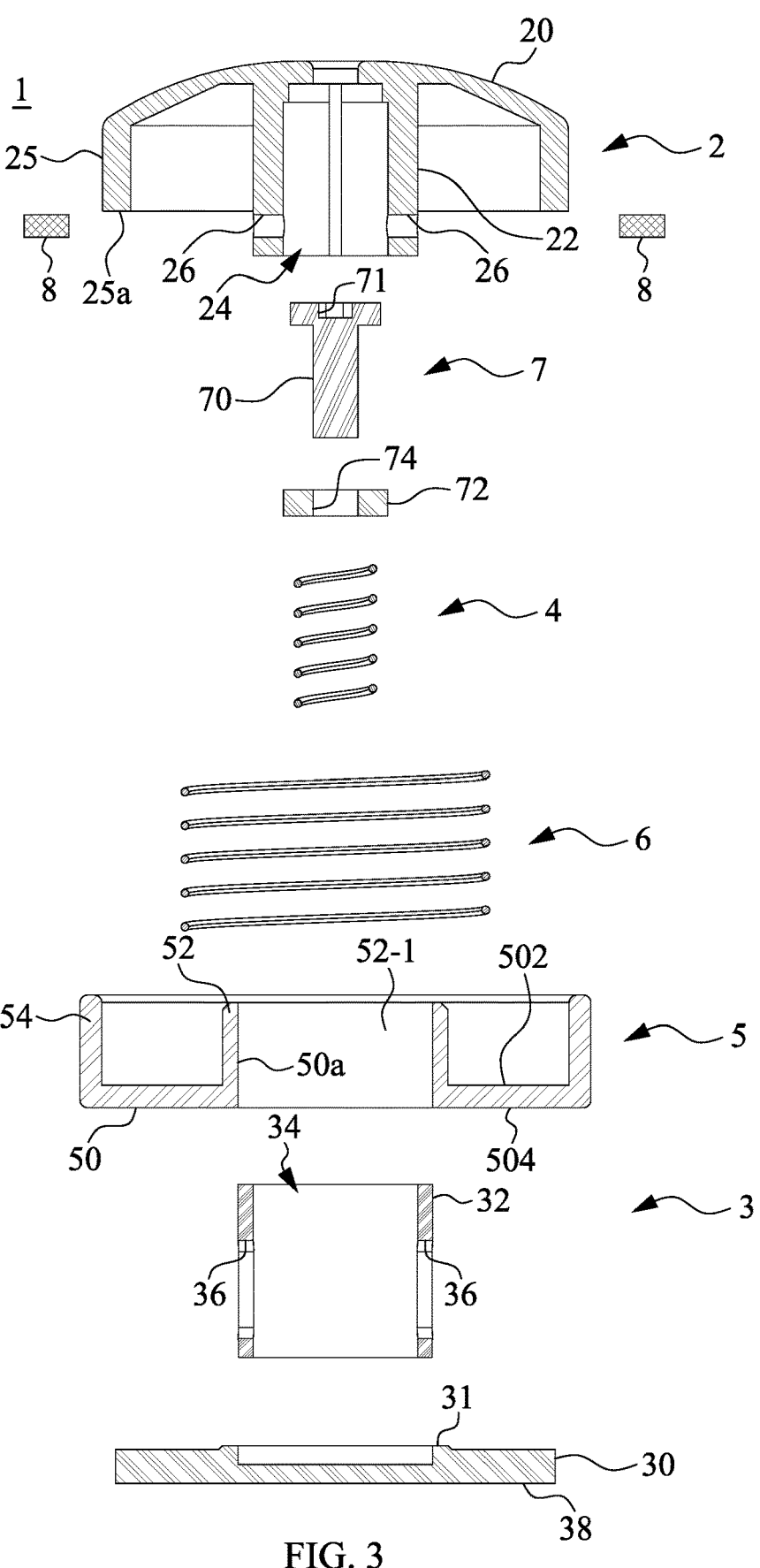
FIG. 3 is a schematic cross-sectional view of a press device according to a first embodiment of the present disclosure.
Figure 4:
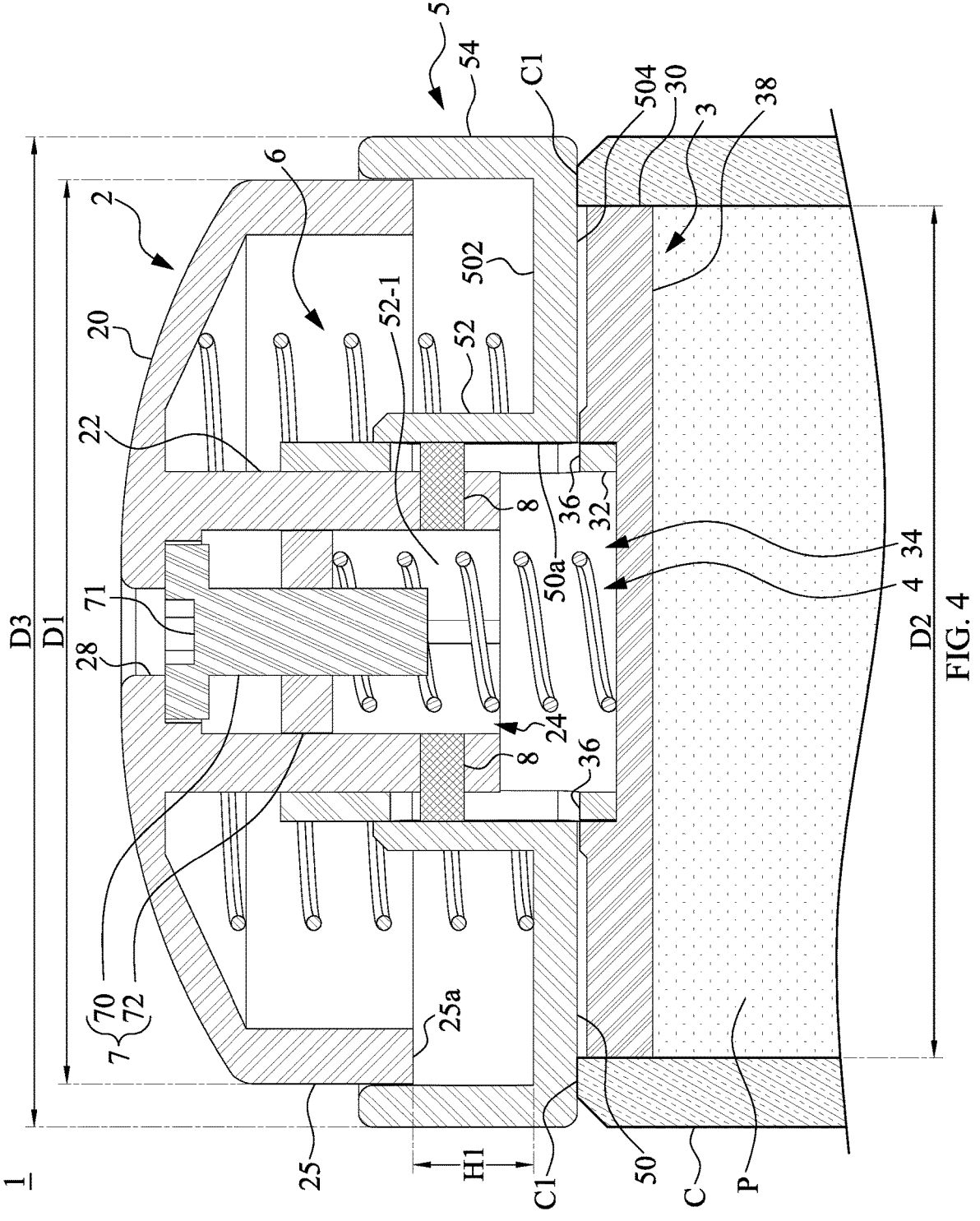
FIG. 4 is a schematic cross-sectional view 1 illustrating actions of a press device according to a first embodiment of the present disclosure.

Please refer to FIG. 1 to FIG. 4. The first embodiment of the present disclosure provides a press device 1. As shown in FIG. 4, the press device 1 may be configured to press powders P in a container C. For example, the container C may be a provided in a handle of a coffee machine, and the powders P may be coffee powders.

In this embodiment, the press device 1 includes an operation element 2, a pressing element 3, a first elastic element 4, and a body 5. The operation element 2 is located on a top side of the press device 1. The pressing element 3 is detachably connected to one side of the operation element 2 and has a pressing surface 38. As shown in FIG. 4, the pressing surface 38 may be used for pressing against the powders P in the container C. In addition, the first elastic element 4 is disposed between the operation element 2 and the pressing element 3, and the opposing ends of the first elastic element 4 abut against the operation element 2 and the pressing element 3 respectively. One side of the body 5 is configured to abut against an end surface C1 of the container C, and the other side of the body 5 is configured to be engaged with the operation element 2.

In this embodiment, the pressing surface 38 may be but is not limited to a plane. In other embodiments, the pressing surface 38 may have a surface of another shape, for example, the surface may have regular or irregular concaves, convex, grooves, ridges, or Y-shaped textures. In addition, the area of the pressing surface 38 may be approximately equal to or slightly smaller than that of the bottom surface in the container, so that the pressing surface 38 is able to be entered into the container C to press the powders P.

In addition, the press device 1 further includes a second elastic element 6 disposed between the operation element 2 and the body 5, so that opposing ends of the second elastic element 6 abut against an inner side of the operation element 2 and an inner side of the body 5, respectively. In an embodiment, the elasticity of the second elastic element 6 is less than the elasticity of the first elastic element 4. It should be noted that the press device 1 in the embodiments shown in FIG. 1 to FIG. 4 includes the second elastic element 6. However, in other embodiments, the press device 1 may also achieve the effects of the present disclosure without the second elastic element 6.

In this embodiment, the first elastic element 4 and the second elastic element 6 are both compression springs made of metal, and their heights may be reduced after being pressed. When the external pressing force is removed, the springs may be restored to their original lengths. In other embodiments, the first elastic element 4 and the second elastic element 6 may be made of other elastic materials such as rubber or another material that can be restored to its original shape after the force applied is removed.

In this embodiment, the operation element 2 of the press device 1 further includes a housing 20 and a first hollow cylinder 22. An outer flange 25 of the housing 20 extends toward the body 5. The first hollow cylinder 22 is disposed on an inner side of the housing 20 and extends toward the body 5. The first hollow cylinder 22 has a channel 24 (as shown in FIG. 2 to FIG. 4), which may receive the first elastic element 4. In addition, the second elastic element 6 may surround the first hollow cylinder 22, and be circumferentially received between the outer flange 25 of the housing 20 and the first hollow cylinder 22. In other words, the first elastic element 4 and the second elastic element 6 may be separated by the first hollow cylinder 22 of the operation element 2. In this embodiment, the housing 20 and the first hollow cylinder 22 are integrally formed. However, in other embodiments, the first hollow cylinder 22 may be mechanically fixed to the housing 20. The housing 20 may have a domed shape, for a user to easily hold and press it.

In this embodiment, the pressing element 3 of the press device 1 includes a pressing plate 30 and a second hollow cylinder 32. An outer side of the pressing plate 30 has the foregoing pressing surface 38. The second hollow cylinder 32 is disposed on the side of the pressing plate 30 that faces the body 5. The second hollow cylinder 32 is provided with a channel 34 therein. The channel 34 of the second hollow cylinder 32 is configured to detachably receive at least a portion of the first hollow cylinder 22 or the first elastic element 4. In this embodiment, the pressing plate 30 and the second hollow cylinder 32 are mechanically connected. For example, one end of the second hollow cylinder 32 is fixed into an annular groove 31 on the inner side of the pressing plate 30 in a press-fit manner (as shown in FIG. 1, FIG. 3, and FIG. 4). In other embodiments, the pressing plate 30 and the second hollow cylinder 32 may be integrally formed or may be combined through adhesive or in another manner.

Figure 10:
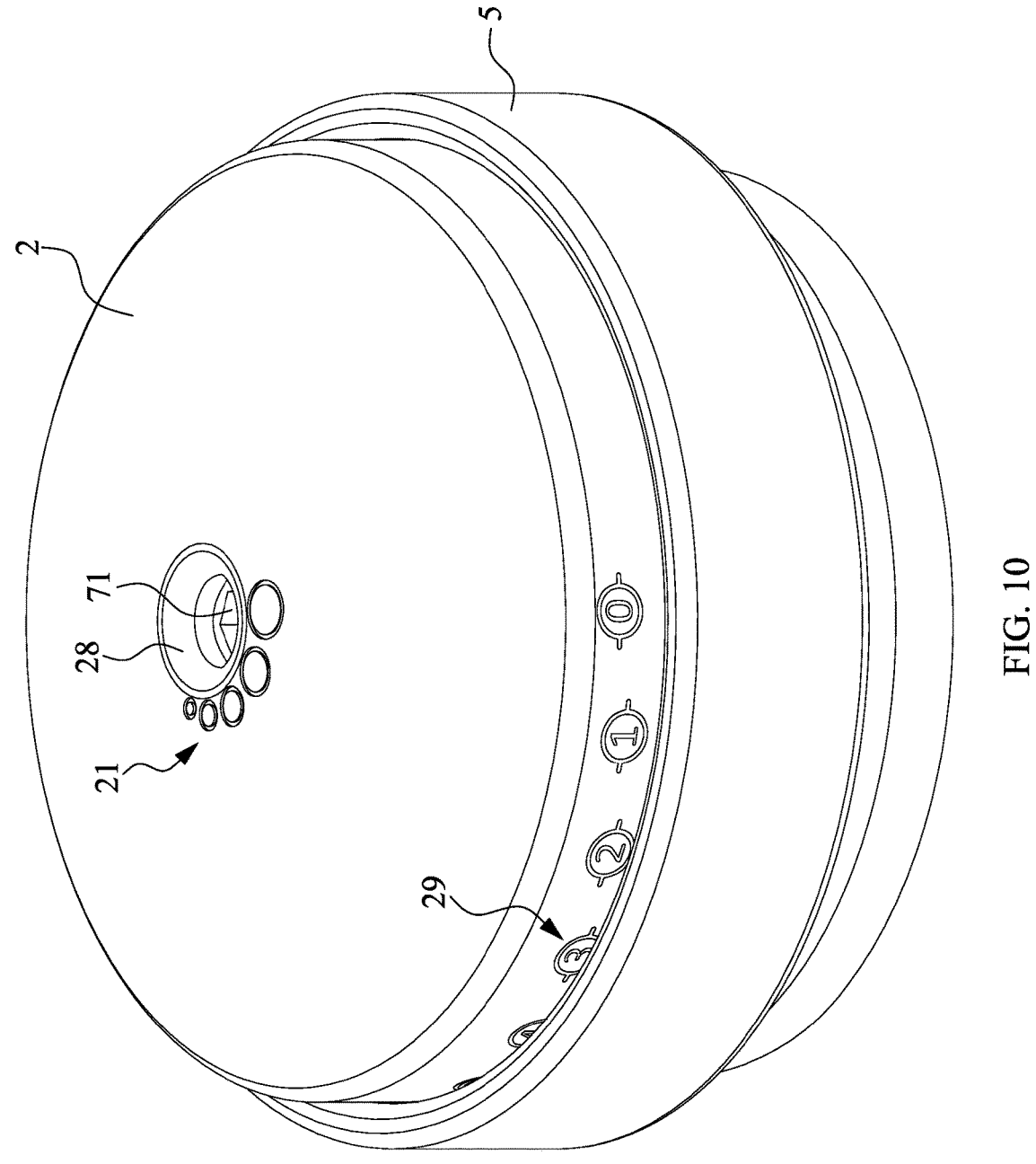
FIG. 10 is a schematic perspective view according to a fifth embodiment of the present disclosure.

In this embodiment, the operation element 2 of the press device 1 further includes an adjuster 7, configured to be received in the channel 24 of the operation element 2, for adjusting an initial compression degree of the first elastic element 4. In this embodiment, the adjuster 7 of the press device 1 includes a bolt 70 and a nut 72. The bolt 70 has outer threads (not shown). The nut 72 has a through hole 74 including inner threads (not shown), for receiving the bolt 70. The nut 72 is configured to enable one side thereof to abut against one end of the first elastic element 4. When the bolt 70 rotates, the nut 72 may be driven to move linearly along the axial direction of the bolt 70 through the engagement between the outer threads of the bolt 70 and the inner threads of the nut 72. More specifically, the bolt 70 has a slot 71, which is exposed in a through hole 28 of the housing 20 of the operation element 2. The user may rotate the bolt 70 by using a tool (such as a screwdriver), to enable the nut 72 to move relative to the first hollow cylinder 22, to further adjust the length of the first elastic element 4, namely, change the elasticity of the first elastic element 4. In other embodiments, the adjuster 7 may have another structure for adjusting the elasticity of the first elastic element 4. In addition, in embodiments of other parts, to simplify the structural complexity and weight of the press device 1, the adjuster 7 may be alternatively omitted. As shown in FIG. 10, the operation element 2 comprises a plurality of different first labels 21 provided near the through hole 28 for facilitating a user to use a tool to adjust the height of the first elastic element 4 based on the alignment of the tool with one of the first labels 21.

In addition, as shown in FIG. 2, the first hollow cylinder 22 may have a long guiding slot 27 therein, in which case the nut 72 has a guiding column 73. The guiding column 73 may move in the long guiding slot 27, to stabilize a position of the nut 72 relative to the first hollow cylinder 22, and prevent the nut 72 from tilting.

As shown in FIG. 2 to FIG. 4, in this embodiment, the first hollow cylinder 22 has a pair of guiding holes 26 and guiding rods 8 disposed opposite to each other. A part of the guiding rod 8 passes through and is fixed in the guiding hole 26. The second hollow cylinder 32 has a guiding slot 36 extending along the axial direction of the second hollow cylinder 32. The guiding rod 8 is configured to be slidable in the guiding slot 36, so as to guide the relative movements between the operation element 2 and the pressing element 3.

In this embodiment, the body 5 of the press device 1 further includes an outer flange 54, a base 50, and an inner flange 52. The base 50 is approximately in a shape of a disc, and has a first side 502 and a second side 504 opposite to each other (as shown in FIG. 3 and FIG. 4). The first side 502 of the base 50 faces the operation element 2, and the second side 504 of the base 50 faces the pressing element 3. The outer flange 54 is disposed on the periphery of the base 50 and extends along the axial direction toward the operation element 2. As shown in FIG. 4, in this embodiment, a diameter D3 of the outer flange 54 is greater than the diameter D1 of the outer flange 25 of the housing 20, and the diameter D3 of the outer flange 54 is greater than the diameter D2 of the pressing element 3. In this embodiment, the outer flange 25 of the housing 20 movably fits with the outer flange 54 on the outer side of the body 5. The outer flange 54 extends from the edge of the first side 502 toward the operation element 2. The inner flange 52 is disposed in the base 50 and forms a through slot 52-1 therein. The inner flange 52 is configured to match with at least one of the first hollow cylinder 22 or the second hollow cylinder 32. In this embodiment, the first hollow cylinder 22 of the operation element 2, the second hollow cylinder 32 of the pressing element 3, and the inner flange 52 of the body 5 fit with each other.

In this embodiment, as shown in FIG. 4, the through slot 52-1 of the inner flange 52 receives a portion of the first hollow cylinder 22 of the operation element 2 or the second hollow cylinder 32 of the pressing element 3, and the second hollow cylinder 32 receives at least a portion of the first hollow cylinder 22. In other words, the second hollow cylinder 32 is sandwiched between the first hollow cylinder 22 and a radial inner side 50*a* of the base 50, and the three may move relative to one another. The guiding rod 8 fixed in the first hollow cylinder 22 may move in the guiding slot 36 of the second hollow cylinder 32, and an outer end of the guiding rod 8 and the second hollow cylinder 32 abut against the radial inner side 50*a* of the base 50, so that the reliability of mutual movements of the first hollow cylinder 22, the second hollow cylinder 32, and the inner flange 52 may be improved.

The following describes powder pressing steps of the press device 1 of this embodiment. Referring to FIG. 4, powders P with a height are first placed inside the container C. The press device 1 is then placed on the container C, to enable an outer side of the base 50 of the body 5 to abut against the end surface C1 of the container C. In this case, the pressing surface 38 of the pressing element 3 may be in contact with the powders P. When the user does not apply a force to the press device 1, the operation element 2 and the pressing element 3 maintain a predetermined distance from each other. In this case, a first height H1 exists between an end surface 25*a* of the outer flange 25 of the housing 20 and a surface of the first side 502.

Figure 5:
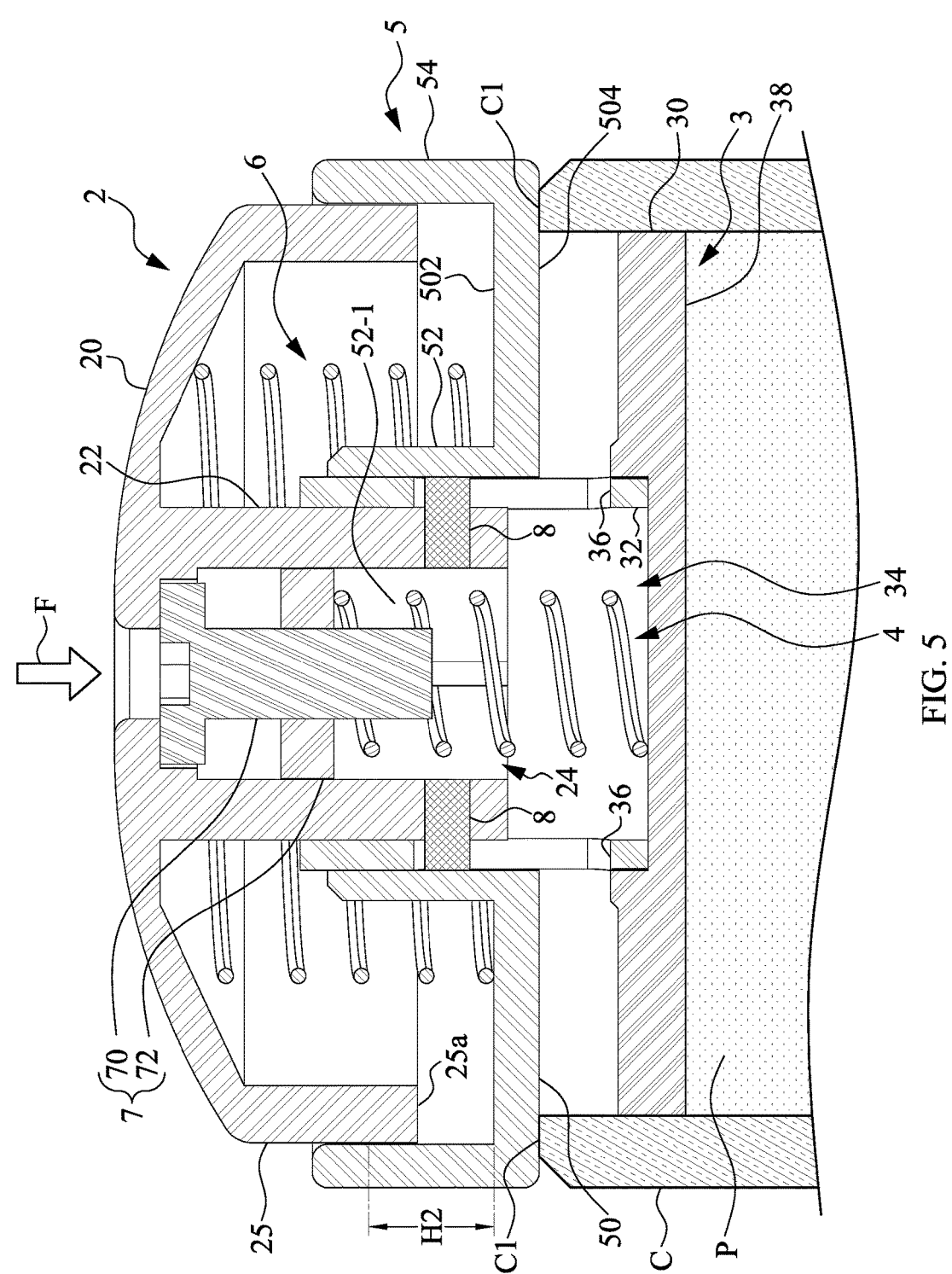
FIG. 5 is a schematic cross-sectional view 2 illustrating actions of a press device according to a first embodiment of the present disclosure.

FIG. 5 is a schematic cross-sectional view 2 illustrating actions of the press device 1 according to the first embodiment of the present disclosure. When the operation element 2 moves under an external force F toward the pressing element 3, the operation element 2 and the pressing element 3 first move toward the container C relative to the body 5 together and compress the second elastic element 6, to enable the pressing surface 38 of the pressing element 3 to press against the powders P, until the pressing surface 38 of the pressing element 3 and the powders P reach an intermediate position. The body 5 is located on the end surface C1 of the container C, so that when the user applies a force to the press device 1, the body 5 does not move relative to the container C, and only the operation element 2 and the pressing element 3 move relative to the container C. In this case, a second height H2 exists between the end surface 25*a* of the outer flange 25 of the housing 20 and the surface of the first side 502, and the first height H1 is greater than the second height H2. In embodiments where the to-be-pressed powders are very fragile and the pressing force needs to be tiny but well controlled, the elasticity of the second elastic element is larger than that of the first elastic element. In some other embodiments, the elasticity of the second elastic element 6 is less than the elasticity of the first elastic element 4.

Figure 6:
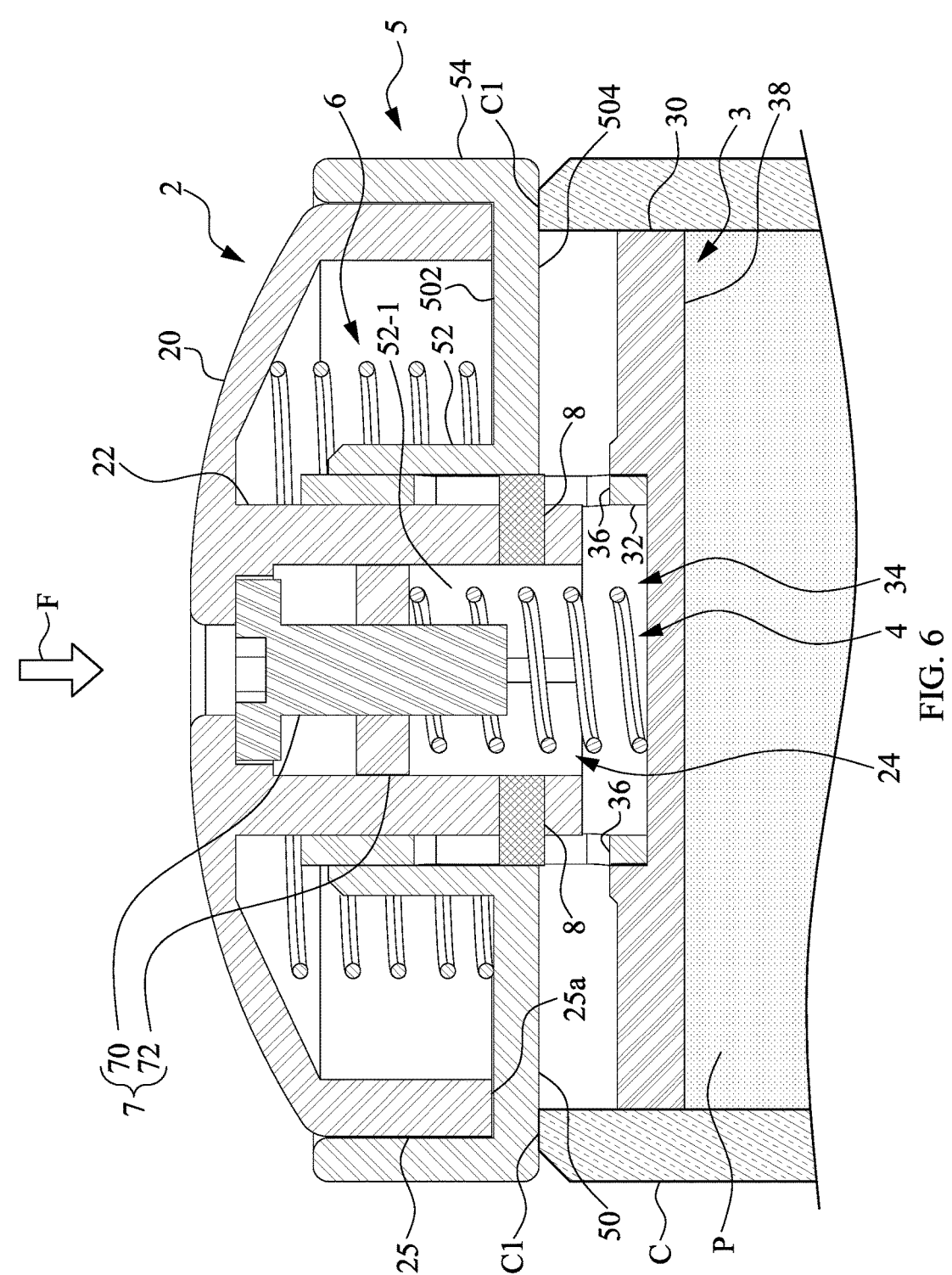
FIG. 6 is a schematic cross-sectional view 3 illustrating actions of a press device according to a first embodiment of the present disclosure.

FIG. 6 is a schematic cross-sectional view 3 illustrating actions of the press device 1 according to the first embodiment of the present disclosure. After the pressing surface 38 of the pressing element 3 compresses the powders P to reach an intermediate position, the user continues to apply a force to enable the operation element 2 to continue to move toward the container C to further compress the second elastic element 6 and start to compress the first elastic element 4, so as to push the pressing surface 38 of the pressing element 3 through the elasticity provided by the first elastic element 4, to further press against the powders P. In this case, the end surface 25*a* of the outer flange 25 of the housing 20 may abut against the surface of the first side 502. In addition, the first hollow cylinder 22 of the operation element 2, the second hollow cylinder 32 of the pressing element 3, and the inner flange 52 of the body 5 substantively overlap along the radial direction of the press device. As shown in FIG. 10, a plurality of different second labels 29 are provided on the outer flange 25 of the housing 20 to aid a user in determining the thickness of the powders (P) based on one of the second labels 29, aligned with the upper edge of the body 5.

When the external force F is removed, the first elastic element 4 and the second elastic element 6 may be restored to their original shapes, and the operation element 2 and the pressing element 3 may be separate from each other and restored to their original positions as shown in FIG. 4. However, it should be noted that, although the operation element 2 is returned to its original position, the powders P have been pressed, so the powders P may substantively maintain a pressed state as shown in FIG. 6.

In this embodiment, the body 5 is supported on the container C. When an external force is applied to the first elastic element 4, the pressing element 3 may press against the powders P steadily and uniformly along a fixed stroke. In addition, through the two stages of strokes applied by the second elastic element 6 and the first elastic element 4, the stability of the pressing operation and uniform distribution of force may be further improved.

In other embodiments, if the press device 1 is not provided with the second elastic element 6, the operation element 2 is directly located on the body 5. When the user applies an external force F, the first elastic element 4 may be directly compressed and enable the pressing element 3 to press against the powders P, so as to achieve the effect of steadily pressing against the powders P.

Figure 7:
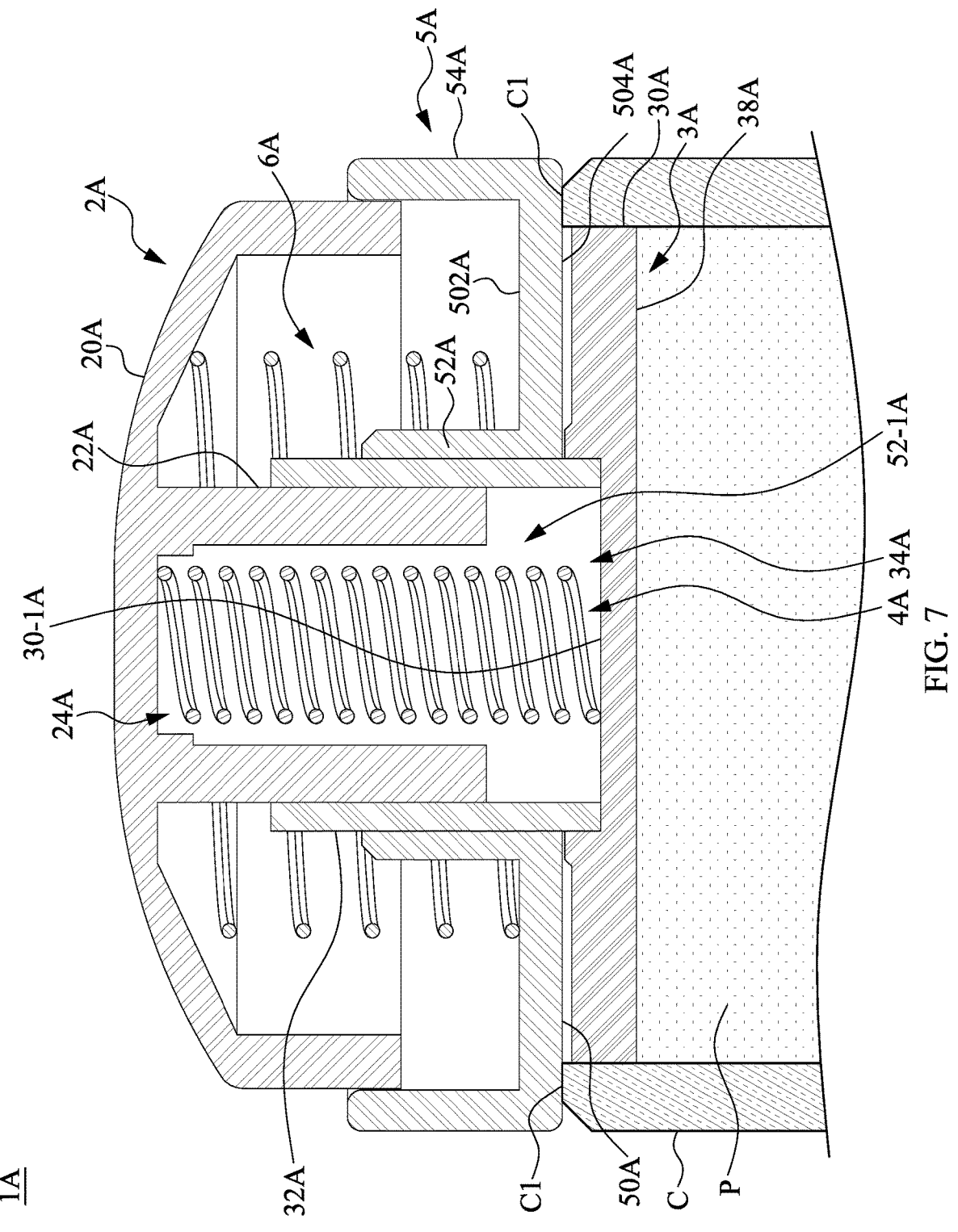
FIG. 7 is a schematic cross-sectional view of a press device according to a second embodiment of the present disclosure.

FIG. 7 is a schematic cross-sectional view of a press device 1A according to a second embodiment of the present disclosure. Referring to FIG. 7, in this embodiment, the press device 1A includes an operation element 2A, a pressing element 3A, a first elastic element 4A, a body 5A, and a second elastic element 6A. The operation element 2A may be located on a top side of the press device 1A. The pressing element 3A is detachably connected to one side of the operation element 2A and has a pressing surface 38A. The pressing surface 38A may be used for pressing against powders P in a container C. The first elastic element 4A is disposed between the operation element 2A and the pressing element 3A, and opposing ends of the first elastic element 4A abut against the operation element 2A and the pressing element 3A, respectively. One side of the body 5A is configured to abut against an end surface C1 of the container C, and the other side of the body 5A is configured to be engaged with the operation element 2A.

In this embodiment, the operation element 2A further includes a housing 20A and a first hollow cylinder 22A. The first hollow cylinder 22A is disposed on an inner side of the housing 20A and extends toward the body 5A. The first hollow cylinder 22A has a channel 24A for receiving the first elastic element 4A therein. The second elastic element 6A is disposed surrounding the first hollow cylinder 22A. In this embodiment, the pressing element 3A of the press device 1A includes a pressing plate 30A and a second hollow cylinder 32A. The pressing plate 30A has a pressing surface 38A. The second hollow cylinder 32A is disposed on the side of the pressing plate 30A that faces the operation element 2A. The second hollow cylinder 32A is internally provided with a channel 34A, which is configured to detachably receive at least a portion of the first hollow cylinder 22A or the first elastic element 4A. In this embodiment, the body 5A further includes an outer flange 54A, a base 50A, and an inner flange 52A therein. The base 50A has a first side 502A facing the operation element 2 and a second side 504A facing the pressing element 3A. The outer flange 54A is disposed on the periphery of the base 50A. The inner flange 52A is located in the base 50A and matches with the second hollow cylinder 32A. A through slot 52-1A is formed inside the inner flange 52A and detachably receives a portion of the first hollow cylinder 22A or the second hollow cylinder 32A, and the second hollow cylinder 32A detachably receives a portion of the first hollow cylinder 22A therein. It should be noted that in this embodiment, the first elastic element 4A is a spring, and the opposing ends thereof abut against an inner side of the housing 20A and an upper surface 30-1A of the pressing plate 30A, respectively.

Figure 8:
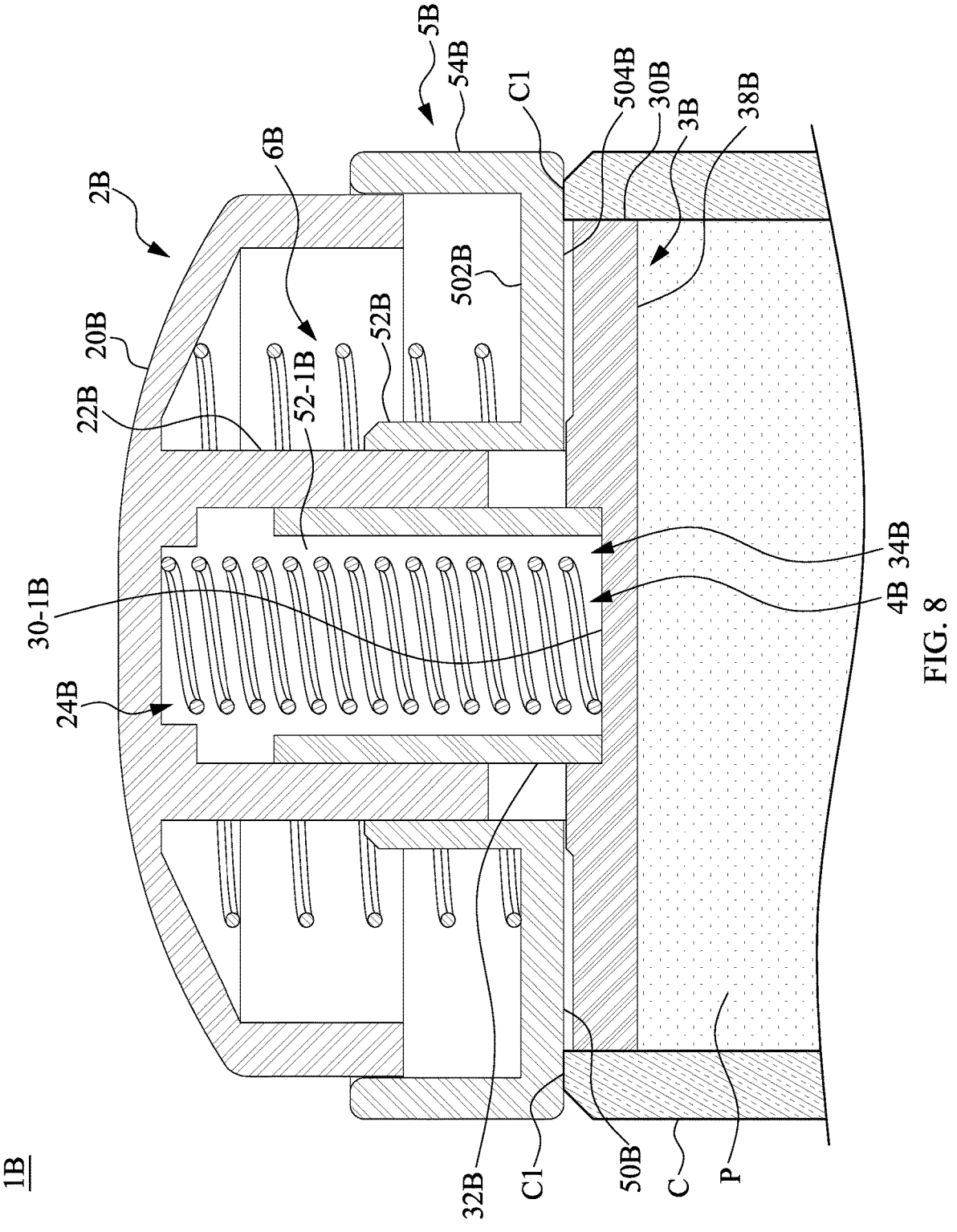
FIG. 8 is a schematic cross-sectional view of a press device according to a third embodiment of the present disclosure.

FIG. 8 is a schematic cross-sectional view of a press device according to a third embodiment of the present disclosure. Referring to FIG. 8, in this embodiment, the press device 1B includes an operation element 2B, a pressing element 3B, a first elastic element 4B, a body 5B, and a second elastic element 6B. The operation element 2B may be located on a top side of the press device 1B. The pressing element 3B is detachably connected to one side of the operation element 2B and has a pressing surface 38B. The pressing surface 38B may be used for pressing against powders P in a container C. The first elastic element 4B is disposed between the operation element 2B and the pressing element 3B, and opposing ends of the first elastic element 4B abut against the operation element 2B and the pressing element 3B respectively. One side of the body 5B is configured to abut against an end surface C1 of the container C, and the other side of the body 5B is configured to be engaged with the operation element 2B. In this embodiment, the operation element 2B further includes a housing 20B and a first hollow cylinder 22B. The first hollow cylinder 22B is disposed on an inner side of the housing 20B and extends toward the body 5B. The first hollow cylinder 22B has a channel 24B therein. The second elastic element 6B is disposed surrounding the first hollow cylinder 22B. In this embodiment, the pressing element 3B of the press device 1B includes a pressing plate 30B and a second hollow cylinder 32B. The pressing plate 30B has a pressing surface 38B. The second hollow cylinder 32B is disposed on a side facing the operation element 2B of the pressing plate 30B. The second hollow cylinder 32B is internally provided with a channel 34B, which is configured to detachably receive at least a portion of the first elastic element 4B. In this embodiment, the body 5B further includes an outer flange 54B, a base 50B, and an inner flange 52B therein. The base 50B has a first side 502B facing the operation element 2 and a second side 504B facing the pressing element 3B. The outer flange 54B is disposed on the periphery of the base 50B. The inner flange 52B is located in the base 50B and matches with the first hollow cylinder 22B. A through slot 52-1B is formed inside the inner flange 52B and detachably receives a portion of the first hollow cylinder 22B or the second hollow cylinder 32B, and the first hollow cylinder 22B detachably receives a portion of the second hollow cylinder 32B. It should be noted that in this embodiment, the first elastic element 4B is a spring, and opposing ends thereof abut against an inner side of the housing 20B and an upper surface 30-1B of the pressing plate 30B, respectively.

Figure 9:
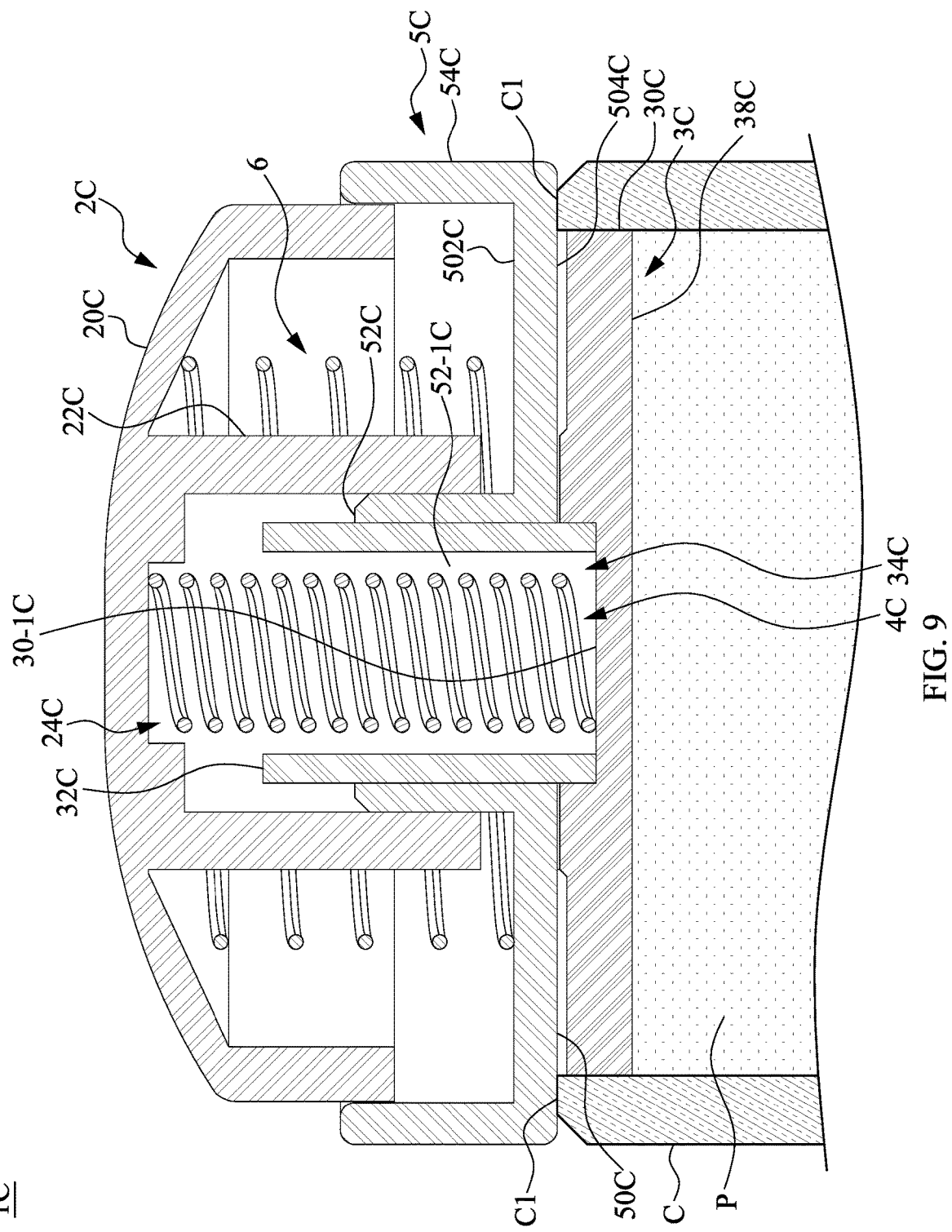
FIG. 9 is a schematic cross-sectional view of a press device according to a fourth embodiment of the present disclosure.

FIG. 9 is a schematic cross-sectional view of a press device according to a fourth embodiment of the present disclosure. Referring to FIG. 9, in this embodiment, a press device 1C includes an operation element 2C, a pressing element 3C, a first elastic element 4C, a body 5C, and a second elastic element 6C. The operation element 2C may be located on a top side of the press device 1C. The pressing element 3C is detachably connected to one side of the operation element 2C and has a pressing surface 38C. The pressing surface 38C may be used for pressing against powders P in a container C. The first elastic element 4C is disposed between the operation element 2C and the pressing element 3C, and opposing ends of the first elastic element 4C abut against the operation element 2C and the pressing element 3C, respectively. One side of the body 5C is configured to abut against an end surface C1 of the container C, and the other side of the body 5C is configured to be engaged with the operation element 2C. In this embodiment, the operation element 2C further includes a housing 20C and a first hollow cylinder 22C. The first hollow cylinder 22C is disposed on an inner side of the housing 20C and extends toward the body 5C. The first hollow cylinder 22C has a channel 24C therein. The second elastic element 6C is disposed surrounding the first hollow cylinder 22C. In this embodiment, the pressing element 3C of the press device 1C includes a pressing plate 30C and a second hollow cylinder 32C. The pressing plate 30C has a pressing surface 38C. The second hollow cylinder 32C is disposed on a side facing the operation element 2C of the pressing plate 30C. The second hollow cylinder 32C is provided with a channel 34C therein, which is configured to detachably receive at least a portion of the first elastic element 4C. In this embodiment, the body 5C further includes an outer flange 54C, a base 50C, and an inner flange 52C. The base 50C has a first side 502C facing the operation element 2 and a second side 504C facing the pressing element 3C. The outer flange 54C is disposed on the periphery of the base 50C. Two sides of the inner flange 52C match with the first hollow cylinder 22C and the second hollow cylinder 32C, respectively. A through slot 52-1C is formed in the inner flange 52C. The first hollow cylinder 22C detachably receives a portion of the inner flange 52C, the second hollow cylinder 32C, and the first elastic element 4C. The through slot 52-1C in the inner flange 52C detachably receives a portion of the second hollow cylinder 32C or the first elastic element 4C therein. It should be noted that in this embodiment, the first elastic element 4C is a spring, and opposing ends thereof abut against an inner side of the housing 20C and an upper surface 30-1C of the pressing plate 30C, respectively.

Based on the above, the present disclosure provides a press device with a body thereof located on a container, wherein an external force may be applied to a first elastic element, to cause a pressing element to press against powders steadily and uniformly along a fixed stroke.

In addition, when the press device further includes a second elastic element disposed between an operation element and the body, by compressing the stroke through two stages of the second elastic element and the first elastic element, the stability of the pressing operation and uniform distribution of force may be further improved.

The terminology used in the description of the present disclosure is for the purpose of describing particular embodiments only, and is not intended to limit the disclosure. As used in the description of the disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items.

It shall be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The use of directional terms such as "above", "under," "upper," "lower," "below," "left," "right," "up," "down," "top," "bottom," "vertical," "horizontal," and like terms are meant to assist with understanding relative relationships among design elements and should not be construed as meaning an absolute direction in space nor regarded as limiting. For example, in some embodiments, "a first component is on a second component" describes the first component being on the second component (the first component is directly on the second component), while some other components are between the first and second components.

Terms such as "approximately," "substantially," or "about" are applied to describe a small variation of a structural unit of an apparatus. When a term is used in conjunction with another term to describe a particular characteristic of the claimed disclosure, such term can indicate the exact events or circumstances, and similar exact events or circumstances.

Obviously, numerous modifications and variations of the present disclosure are possible in light of the above teachings. It is therefore to be understood that within the scope of the appended claims, the present disclosure may be practiced otherwise than as specifically described herein.

I claim:

1. A press device, comprising:
an operation element, comprising a first hollow cylinder and an outer flange surrounding the first hollow cylinder;
a pressing element, detachably connected to a side of the operation element, the pressing element comprising a second hollow cylinder and having a pressing plate for pressing powders in a container;
a first spring, disposed between the operation element and the pressing element, opposing ends of the first spring abutting against the operation element and the pressing element respectively; and
a body having a second side configured to abut against an end surface of the container, the body having an inner flange disposed at a first side opposing to the second side;
wherein the first hollow cylinder of the operation element, the second hollow cylinder of the pressing element, and the inner flange of the body are configured to fit in one another, the operation element is initially at a predetermined height with respect to the body, the predetermined height is a distance between an end surface of the outer flange of the operation element and a stopping surface of the first side of the body:
wherein when the operation element is pressed to a location with the end surface of the outer flange being abutted against the stopping surface of the first side of the body, the first spring still exerts force on the pressing plate to tightly press against the powders.

2. The press device according to claim 1, further comprising:
a second spring, disposed between the operation element and the body and opposing ends of the second spring abutting against the operation element and the body, respectively, wherein the second spring surrounds the first spring.

3. The press device according to claim 2, wherein when the operation element is pressed, the operation element is moved together with the pressing element in relation to the body toward the container and compresses the second spring.

4. The press device according to claim 3, wherein when the pressing plate of the pressing element presses against the powders in the container and reaches an intermediate position, the operation element is further pressed and the operation element further compresses the second spring so that the first spring provides a force to the pressing plate of the pressing element to further compress the powders in the container.

5. The press device according to claim 4, wherein when the powders in the container are further compressed, the first hollow cylinder of the operation element, the second hollow cylinder of the pressing element, and the inner flange of the body overlap along a radial direction of the press device.

6. The press device according to claim 1, wherein the operation element comprises a housing, comprising an outer flange and wherein the first hollow cylinder of the operation element comprises a channel therein.

7. The press device according to claim 6, wherein the operation element comprises an adjuster, configured to be received in the channel for adjusting the initial length of the first spring.

8. The press device according to claim 1, wherein the pressing plate of the pressing element has a pressing surface at the outer side of the pressing plate and wherein the second hollow cylinder is disposed at an inner side of the pressing plate and configured to detachably receive at least a portion of the first hollow cylinder or the first spring.

9. The press device according to claim 6, wherein the body comprises:
an outer flange having a diameter greater than a diameter of the pressing element; and
a base having a first side and a second side opposing the first side;
wherein the first side faces the operation element, the outer flange extends from the edge of the first side toward the operation element, and the second side faces the pressing element; and
wherein the outer flange of the operation element movably fits with the outer flange of the body along an axial direction of the press device.

10. The press device according to claim 9, wherein the inner flange of the body extends from the base toward the operation element and is configured to match with at least one of the first hollow cylinder or the second hollow cylinder.

11. The press device according to claim 8, wherein the operation element comprises a plurality of different first labels provided near the through hole for aiding a user in adjusting the height of the first spring, and a plurality of different second labels provided on the outer flange of the housing for aiding a user in determining a thickness of the powders.

12. A press device, comprising:
an operation element, comprising a first hollow cylinder;
a pressing element, detachably connected to a side of the operation element, the pressing element comprising a second hollow cylinder and having a pressing plate for pressing powders in a container;

a first spring, disposed between the operation element and the pressing element, opposing ends of the first spring abutting against the operation element and the pressing element respectively; and a body having a second side configured to abut against an end surface of the container, the body having an inner flange disposed at a first side opposing to the second side;

wherein the first hollow cylinder of the operation element, the second hollow cylinder of the pressing element, and the inner flange of the body are configured to fit in one another, the operation element comprises a housing, comprising an outer flange and wherein the first hollow cylinder of the operation element comprises a channel therein, the operation element comprises an adjuster, configured to be received in the channel for adjusting the initial length of the first spring, the adjuster comprises:

a bolt having outer threads on an outer surface of the bolt and a top of the bolt having a slot therein, the slot being configured to be exposed in a through hole of the housing; and a nut having a through hole therein for receiving the bolt, the nut having inner threads in the through hole.

13. The press device according to claim 12, wherein the first hollow cylinder has a long guiding slot therein and the nut has a guiding column movable in the long guiding slot for stabilize a position of the nut relative to the first hollow cylinder, and prevent the nut from tilting and wherein the nut is configured to abut against an end of the first spring, so that when the bolt is driven to rotate, the nut moves linearly along an axial direction of the bolt through the engagement between the outer threads of the bolt and the inner threads of the nut.

14. A press device, comprising:

an operation element, comprising a first hollow cylinder;

a pressing element, detachably connected to a side of the operation element, the pressing element comprising a second hollow cylinder and having a pressing plate for pressing powders in a container;

a first spring, disposed between the operation element and the pressing element, opposing ends of the first spring abutting against the operation element and the pressing element respectively; and a body having a second side configured to abut against an end surface of the container, the body having an inner flange disposed at a first side opposing to the second side;

wherein the first hollow cylinder of the operation element, the second hollow cylinder of the pressing element, and the inner flange of the body are configured to fit in one another, the first hollow cylinder has a guiding hole passing through the first hollow cylinder in a transverse direction and a guiding rod disposed and fixed in the guiding hole.

15. The press device according to claim 14, wherein the second hollow cylinder has a guiding slot passing through the second hollow cylinder in a transverse direction and extending in an axial direction of the second hollow cylinder.

16. The press device according to claim 15, wherein the guiding rod is configured to be slidable in the guiding slot so as to guide the relative movements between the operation element and the pressing element.

\* \* \* \* \*